3,357,911
ELECTROCHEMICAL TIMER
Garrett Gruner, Jackson, and Clifford J. Vander Yacht, Michigan Center, Mich., assignors to Sparton Corporation, Jackson, Mich., a corporation of Ohio
Filed Dec. 31, 1964, Ser. No. 422,636
11 Claims. (Cl. 204—195)

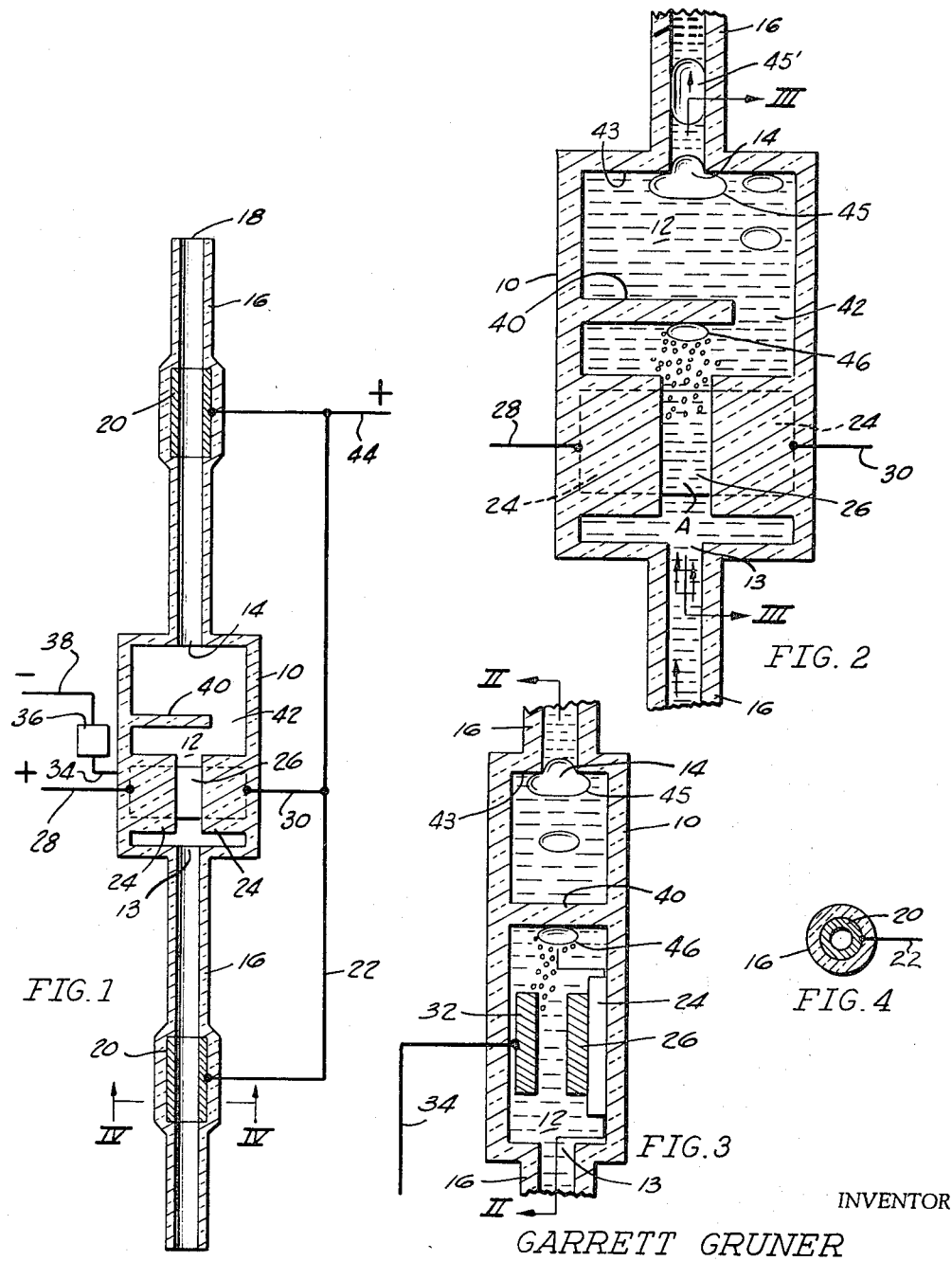

The invention pertains to an electric timing device, and particularly relates to a timer incorporating the principles of electrolysis, wherein the timer functions as a switch to disrupt a flow of electric current after a predetermined interval of time.

Timing devices using electrochemical principles are capable of accurately controlling the passage of current through a conductor for a predetermined time. Faraday's Law of Electrolysis recognizes that the metal liberated in an electrolytic cell is directly proportional to the current flowing through the electrolyte. By employing the electrode being etched as a conductor, and employing predetermined currents, and electrolytes, the time required to completely etch and sever the electrode to disrupt the flow of current therethrough may be accurately determined. An electrochemical timer of this type, wherein sea water is the electrolyte, has particular use and advantages with devices supported upon or submerged within sea water, and has particular advantage when used with submarine detection devices known as Sonobouys, and the like. While the timer of the invention is not limited to use with submarine detection apparatus, its simplicity, light-weight, dependability and accuracy of operation makes its use ideal for this type of application.

In constructing an electrochemical timer adapted to control an electric circuit, the time involved to etch the circuit conductor is, in part, governed by the type of material of the current electrode, the electrolyte, and the amount of current flowing through the electrolyte. Of course, the amount of metal of the electrode to be etched away is also important in providing an accurate timing interval. Among the factors which must be considered in constructing an electrochemical timer are the exposed area of the control and etched electrodes, the composition of the electrodes, the composition of the electrolyte, the temperature of the electrolyte, the concentration of the electrolyte and the amount of current flowing through the electrolyte. Further considerations are the oxidizing properties of the etched electrode, the existence of stray currents which might accelerate or decelerate the etching process, and the depletion of the chemical properties of the electrolyte. Also, to maintain a relatively constant rate of etching, the exposed area of the etched electrode should be maintained at a nearly constant value throughout the timing interval.

It is an object of the invention to provide a timer of the electrochemical type which is of a simple and economical construction, yet is able to fulfill the requirements of this type of timer and compensate for, or eliminate, problems and variables relating to the foregoing affecting factors.

By employing a flat strip electrode having only one side and two edges of a limited area exposed to the electrolyte and by controlling the current supplied to the control electrode, the rate of etching may be accurately predetermined, assuming that the temperature of electrolyte is within a known range and the concentration of the electrolyte is maintained at a given level.

To insure that stray electrical currents within the electrolyte do not accelerate or decelerate the rate of etching of the conductor electrode, as produced by the controlled current electrode, the timer employs stray current shielding means utilizing both an increased length of current travel and charged shielding rings to prevent stray electric currents from entering the electrolytic cell.

As sea water is preferably used as the electrolyte, depletion of the electrolyte within the cell occurs due to the oxidizing ions being chemically combined with the metal from the etched electrode. This condition could be cured by forming the electrolytic cell of a large enough volume to prevent depletion to the point wherein the cell would not become inactive during its timing interval. However, such a cell would require an unusually large space and would be unacceptable in many applications for this reason. In order to prevent depletion of the electrolyte, a pump of the gas lift type is incorporated into the cell structure whereby new electrolyte is continually being brought into the cell during the electrolysis process, and the pumping action results from a by-product of the electrolytic action.

Another object of the invention is to provide an electrochemical timer which is of an economical and dependable construction wherein stray electrical currents are prevented from entering the electrolytic cell of the timer and electrolyte pumping means are employed to maintain a flow of fresh electrolyte into the cell during its operation.

A further object of the invention is to provide an electrochemical timer capable of accurately controlling the length of time a conductor is capable of conducting electricity and wherein a relatively high current may be conducted, if desired, even though the physical size of the timer is small.

These and other objects of the invention arising from the details and relationships of the components of an embodiment thereof will be apparent from the following description and accompanying drawings wherein:

FIG. 1 is an elevational, sectional view showing an embodiment of the invention illustrating the wiring associated therewith, FIG. 2 is an elevational, sectional, enlarged, detailed view of an electrolytic cell in accord with the invention during electrolysis, FIG. 3 is an enlarged, detailed, elevational, sectional view of the electrolytic cell as taken along section III—III of FIG. 2, and FIG. 4 is a detailed, elevational, sectional view taken along section IV—IV of FIG. 1.

In FIG. 1 the timer housing is generally designated at 10, and is constructed of a dielectric material of glass, ceramic, synthetic material, or the like to form a cell 12. The cell 12 includes an electrolyte inlet opening 13 defined therein and, in opposed relation within the cell, an electrolyte outlet 14 is formed. Elongated conduits 16 of dielectric material, which may be integral with the housing 10, as shown, communicate with the inlet and outlet openings 13 and 14, and each has an open end 18 disposed at a substantial distance from the cell. A guard or shielding ring 20 is defined within each conduit 16, formed of an electrical conducting material, whereby the electrolyte entering the conduits passes through the rings. The rings 20 are electrically connected to by a conductor 22. A pair of enlargements 24 is formed with the cell 12. The electrode 26 to be etched is of a rectangular cross section and is attached to the enlargements 24 and masked by suitable means so that only one side and the top and bottom edges of a limited area A of the electrode is exposed to the electrolyte with the cell. A conductor 28 is attached to one end of the electrode 26 and a conductor 30 is affixed to the other end in circuit with the conductor 22.

A control electrode 32 is also disposed within the cell 12, and is located a predetermined distance from the conductor electrode 26. A lead 34 is connected to the control electrode and current is supplied thereto through a current control device 36 supplied from negatively charged conductor 38. The current supplied to conductors 28 and 38, with the polarities indicated, preferably comes from the apparatus with which the timer is used. For instance, in the case of submarine detection devices which are battery operated, conductors 28 and 38 will be connected to the batteries thereof. The control electrode 32 usually will be constructed of steel and may be plated to prevent rust. The conductor electrode 26 may be of steel, zinc, cadmium, or other material having satisfactory oxidizing properties for the particular use described.

A baffle 40 is defined within the cell 12 vertically disposed above the electrodes 26 and 32 and transversely disposed to the length of the conduits 16, and serves as a bubble retainer to permit accumulation of the hydrogen gas created during the electrolysis which is liberated from the control electrode 32. The baffle 40 does not extend completely across the cell, and an opening 42, or gate, is defined adjacent the right cell wall, FIG. 2, permitting a hydrogen bubble of a large size to escape upon the bubble building up to the desired size under the retainer baffle 40.

A conductor 44 is connected to the conductor 22 and constitutes the current supply to the device being supplied with electrical current and being timed. Of course, the device being controlled by the timing device is also supplied with a negative current from the battery of the apparatus.

In operation, the timer of the invention is disposed within the apparatus, such as submarine detection devices, in such a manner that the cell inlet opening 13 will be vertically disposed below the cell outlet opening 14. Thus, upon being submerged within sea water, the sea water may flow into the cell 12 through the lower conduit 16 and the inlet opening 13, while the air initially within the cell may escape through the outlet opening 14 and the upper conduit 16. In this manner the cell 12 will be completely filled with the sea water electrolyte. Upon a positive current being supplied to the conductor 28, and a negative current being transmitted to the control electrode 32 through the conductor 38, and assuming that the apparatus being timed, such as a radio, is directly supplied with a negative current and is supplied with a positive current by the conductor 44, the timed apparatus will be energized and the conductor electrode 26 will form a portion of the circuit supplying the positive current. Due to the difference in polarity imposed upon the electrodes 26 and 32, the unmasked portion of the electrode 26 will begin to be etched due to the liberation of the metal thereof during the electrolysis procedure. While stray electrical currents may exist in the salt water surrounding the housing 10 and electrolytic cell 12, such as those generated by a sea water battery or the like, such currents are not permitted to enter the cell 12 due to the length of the conduits 16 and the charge imposed on the shielding rings 20. Thus, the etching of the electrode 26 will take place at a predetermined rate as controlled by the current being imposed upon the control electrode 32. The current control device 36 may be any conventional current regulator or circuit for supplying a constant current to the lead 34 and thereby insure a uniform rate of etching.

As the electrolysis takes place, the oxidizing ions of the electrolyte within cell 12 are being depleted. However, while the electrolyte is being depleted of oxidizing ions, the control electrode 32 is liberating small hydrogen bubbles, as will be apparent from FIG. 2. The small hydrogen bubbles are retained by the baffle 40 and will accumulate into a larger bubble 46. Upon the bubble 46 reaching a size which permits the bubble to overcome the surface tension acting thereon and wherein the bubble 46 can move along the underside of baffle 40 into opening 42 so the bubble 46 will escape the baffle through the opening 42 and rise within the cell to engage the top surface 43 of cell 12. The diametrical dimension of the cell outlet 14 is such that surface tension prevents a bubble 46 from passing into the upper conduit, however the bubbles 46 will accumulate at outlet 14 into a larger bubble 45 which will eventually have sufficient buoyancy to overcome the surface tension and rise in conduit 16 as at 45', FIG. 2. It will therefore be appreciated that the outlet 14 functions as a bubble release means controlling the release of bubbles into the upper conduit 16. As the bubble 45' rises in the upper conduit 16, it will completely fill the conduit cross section and the rising bubble will push the sea water in the conduit above the bubble from the conduit. As the rising bubble 45' tends to create a vacuum below the bubble within the conduit, fresh electrolyte will be drawn into the cell 12 through the lower conduit 16 and the inlet 13. As the formation of hydrogen bubbles is continuous during the electrolysis action, the pumping action of the bubbles 45' will continue to replenish the electrolyte and prevent depletion of the oxidizing ions. In addition to the direct pumping action produced by the bubbles, the inertia forces caused from placing the electrolyte in motion by the bubbles 45' also produces a flushing action which continues for a short time after the bubble leaves the upper conduit 16.

Etching of the electrode 26 is continuous, and the fact that etching is taking place from one of the electrode sides and the top and bottom edges insures that the area being etched remains substantially constant during the electrolysis operation. As the electrode 26 becomes thin, a voltage difference develops across this thin section due to the high resistance thereof. This causes the etching to then primarily occur in the area closest to the conductor of the highest potential and, when this thin section is severed, a large current continues to flow across the small break for a brief moment which substantially increases the break to a point wherein current flow from the conductor 28 to the conductor 30 is interrupted. Thus, severing of the electrode 26 will de-energize the conductor 44 and deactivate the radio or other device being supplied thereby.

It, therefore, will be appreciated that the invention produces an electrochemical timer which in a very simple and unique manner functions as a time-controlled switch whose interval of operation may be accurately controlled by employing predetermined current characteristics and electrode sizes. The use of the conduits 16 and the guard rings 20 prevents stray currents from adversely affecting the electrolysis procedure, and the use of the bubble pump provides a supply of fresh electrolyte, thereby assuring a uniform electrolysis action.

The illustrated embodiment is only one of many arrangements of the cell and inlet and outlet conduits which may be employed to practice the concepts of the invention, and it is understood that those skilled in the art may arrive at various modifications within the spirit and scope of the invention other than those shown and described, and it is intended that the invention be defined only by the scope of the following claims:

We claim:
1. An electrochemical timing device comprising, in combination,
 (a) a dielectric housing defining a cell,
 (b) an inlet conduit communicating with said cell,
 (c) an outlet conduit communicating with said cell,
 (d) a control electrode within said cell,
 (e) a conductor electrode to be etched within said cell, said conductor including opposed end portions,
 (f) a shielding device located within each of said conduits, and
 (g) a conductor connected to each end portion of said conductor electrode.

2. An electrochemical timing device comprising, in combination,
 (a) a dielectric housing defining a cell,
 (b) an inlet conduit communicating with said cell,
 (c) an outlet conduit communicating with said cell,
 (d) a control electrode within said cell, (e) a conductor electrode to be etched within said cell, said conductor including opposed end portions, (f) a shielding device located within each of said conduits, (g) means supplying a control current to said control electrode, (h) means supplying a current to said shielding devices, and (i) conductors attached to said end portions of said conductor electrode.

3. In an electrochemical timing device as in claim 2 wherein:

(a) conductors connect said shielding devices to said conductor electrode.

4. In an electrochemical timing device as in claim 2 wherein:

(a) said shielding devices comprise annular rings located within and circumscribing the passage of the associated conduit.

5. An electrochemical timing device comprising, in combination, (a) a dielectric housing defining a cell, (b) an elongated inlet conduit communicating with said cell, (c) an elongated outlet conduit communicating with said cell, (d) a control electrode within said cell, (e) a conductor electrode to be etched within said cell, said conductor including opposed end portions, (f) means supplying a control current to said control electrode, and (g) conductors attached to said end portions of said conductor electrode.

6. An electrochemical timing device comprising, in combination, (a) a dielectric housing defining a cell, (b) an inlet conduit communicating with said cell, (c) an outlet conduit defining a passage having an entrance communicating with said cell and an outlet adapted to be vertically located above said outlet conduit entrance, (d) a control electrode within said cell, (e) a conductor electrode to be etched within said cell, said conductor including opposed end portions, (f) means supplying a control current to said control electrode, (g) conductors attached to said end portions of said conductor electrode, (h) bubble accumulating means located within said cell vertically disposed above said control electrode, and (i) bubble release means defined in said cell adapted to release a bubble into said outlet conduit passage upon a bubble accumulating within said cell having a normal horizontal area at least as great as the cross-sectional area of said outlet conduit passage.

7. In an electrochemical timer as in claim 6 wherein:

(a) said electrodes are located intermediate said outlet conduit entrance and the location of inlet conduit communication with said cell.

8. In an electrochemical timer as in claim 6 wherein:

(a) said bubble accumulating means comprises a baffle defined in said cell vertically disposed above said control electrode.

9. In an electrochemical timer as in claim 6 wherein:

(a) said bubble accumulating means comprises a baffle defined in said cell vertically disposed above said control electrode, and (b) said outlet conduit entrance constitutes bubble release means.

10. An electrochemical timing device comprising, in combination, (a) a dielectric housing defining a cell, (b) an inlet conduit communicating with said cell, (c) an outlet conduit defining a passage having an entrance communicating with said cell and an outlet adapted to be vertically located above said outlet conduit entrance, (d) a control electrode within said cell, (e) a conductor electrode to be etched within said cell, said conductor including opposed end portions, (f) a shielding device located within each of said conduits, (g) means supplying a control current to said control electrode, (h) means supplying a current to said shielding devices, (i) conductors attached to said end portions of said conductor electrode, (j) bubble accumulating means located within said cell vertically disposed above said control electrode, and (k) bubble release means defined in said cell adapted to release a bubble into said outlet conduit passage upon a bubble accumulating within said cell having a normal horizontal area at least as great as the cross-sectional area of said outlet conduit passage.

11. An electrochemical timing device adapted to be submersed in an electrolyte comprising, in combination, (a) a dielectric housing defining a cell, (b) a control electrode within said cell, (c) a conductor electrode to be etched within said cell, said conductor including opposed end portions, (d) means supplying a control current to said control electrode, (e) conductors attached to said end portions of said conductor electrode, and (f) a gas lift pump associated with said cell, said pump including a pump circuit communicating with said cell and receiving gas generated within said cell whereby during electrolysis electrolyte is circulated through said cell.

References Cited

UNITED STATES PATENTS

| 1,558,784 | 10/1925 | Bleecker | 102—70.2 |
| 2,526,670 | 10/1950 | Kissinger et al. | 102—16 |
| 2,629,083 | 2/1953 | Mason et al. | 340—2 |
| 2,741,182 | 4/1956 | Faust et al. | 102—70.2 |
| 3,046,786 | 7/1962 | Tessem | 204—195 |
| 3,081,466 | 3/1963 | Bailey | 340—2 |
| 3,290,669 | 12/1966 | Mews | 324—68 |

HOWARD S. WILLIAMS, *Primary Examiner.*

JOHN H. MACK, *Examiner.*

T. TUNG, *Assistant Examiner.*